United States Patent
Zhuang et al.

(10) Patent No.: US 9,605,131 B2
(45) Date of Patent: Mar. 28, 2017

(54) THERMOPLASTIC POLYURETHANES COMPOSITION AND PREPARATION PROCESSES THEREOF

(71) Applicant: BASF SE, Ludwigshafen (DE)

(72) Inventors: Wei Zhuang, Shanghai (CN); Bin Chen, Shanghai (CN); Akira Nomura, Shanghai Pudong (CN); Etsuhiro Yamamoto, Yatomi (JP); Jianqiang Qu, Shanghai (CN); Michi Kondo, Singapore (SG); Tienkuan Lim, Petaling BA (MY); Frank Schaefer, Stemwede (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/857,524

(22) Filed: Apr. 5, 2013

(65) Prior Publication Data

US 2013/0267639 A1    Oct. 10, 2013

(30) Foreign Application Priority Data

Apr. 5, 2012    (WO) ................ PCT/CN2012/073525

(51) Int. Cl.
| | |
|---|---|
| *C08K 5/00* | (2006.01) |
| *C08K 5/12* | (2006.01) |
| *C08L 75/04* | (2006.01) |
| *C08G 18/48* | (2006.01) |
| *C08G 18/66* | (2006.01) |
| *C08G 18/76* | (2006.01) |
| *C08G 18/08* | (2006.01) |

(52) U.S. Cl.
CPC ............ *C08K 5/12* (2013.01); *C08G 18/0895* (2013.01); *C08G 18/4854* (2013.01); *C08G 18/6674* (2013.01); *C08G 18/7671* (2013.01); *C08L 75/04* (2013.01)

(58) Field of Classification Search
None
See application file for complete search history.

(56) References Cited

U.S. PATENT DOCUMENTS

2010/0286297 A1    11/2010  Ortalda et al.

FOREIGN PATENT DOCUMENTS

| | | |
|---|---|---|
| CN | 100406428 C | 7/2008 |
| EP | 0 134 455 B2 | 6/1991 |
| JP | 2010-163557 A | 7/2010 |
| WO | WO 2008/045637 A1 | 4/2008 |
| WO | WO 2010/125009 A1 | 11/2010 |

*Primary Examiner* — Susannah Chung
*Assistant Examiner* — Robert T Butcher
(74) *Attorney, Agent, or Firm* — Oblon, McClelland, Maier & Neustadt, L.L.P.

(57) ABSTRACT

This invention is directed to a thermoplastic polyurethanes composition comprising polyether-based thermoplastic polyurethane and 1,2-cyclohexane dicarboxylic acid ester and preparation processes thereof. The thermoplastic polyurethane composition has a good mold release behavior in injection molding without undesirably significant shrinkage and surface blooming of final product.

19 Claims, No Drawings ously in prior art and provide a TPU composition with improved processability, especially reduced mold

THERMOPLASTIC POLYURETHANES COMPOSITION AND PREPARATION PROCESSES THEREOF

CROSS REFERENCE TO RELATED APPLICATION

This application is a 371 of PCT/CN2012/073525, filed on Apr. 5, 2012.

TECHNOLOGY FIELD

The invention relates to a thermoplastic polyurethanes composition with a good mold release behavior in injection molding and a low shrinkage of final product and preparation processes thereof.

BACKGROUND

Thermoplastic polyurethanes (TPU) are of industrial importance in many applications because of combination of good mechanical properties with known advantages of inexpensive thermoplastic processing. By modifying components of TPU, a wide variety of properties can be achieved. Among all kinds of TPU, polyether-based TPU is one of the most important series because of its excellent hydrolysis resistance and low temperature flexibility. An overview of TPU including their properties and applications can be found in Hans-Georg Wussow, "Thermoplastic Elastomers", Ullmann's Encyclopedia of Industrial Chemistry, Electronic Release, 7th ed., chap. 2 "Thermoplastic Polyurethane Elastomers", Wiley VCH, Weinheim, 2004.

Soft thermoplastic polyurethane, which generally has a hardness of less than Shore A 98, in particular from Shore A 40 to Shore A 95, is hard to process due to small proportion of hard segment. In injection molding process, the soft TPU, especially soft polyether-based TPU, tends to stick in mold cavity and therefore needs a large mold releasing force (demolding force) to eject final product from mold. In the case of mass production of TPU products by injection molding process, it normally requires a fully automatic ejection of product from mold with a fixed demolding force. As a result, cooling time of soft TPU in mold must be prolonged in order to realize automatic ejection. In other words, the total cycle time to produce a final product by injection molding is therefore increased. The demolding force has become an important criterion to evaluate processability of a material in mass production through injection molding process.

It is known that some internal or external lubricant waxes e.g. amide wax or ester of montanic acids, as releasing agents can improve mold releasing behavior of TPU. An overview of lubricant waxes used in TPU can be found in H. Zweifel (Ed.), Plastics Additives Handbook, 5. Ausgabe, Hanser Verlag, Munchen 2001, P443ff.

The lubricant wax has been widely used in current TPU product. It is known that TPU with a large amount of an amide wax for example N,N'-ethylene bis-stearylamide (EBS) wax shows good mold releasing property. However, lubricant wax often leads to a strong surface blooming of final TPU product after injection molding, especially after annealing at a certain temperature or placing in a humid weather condition. TPU with ester of montanic acid, e.g. Licowax E from Clariant, also shows good mold releasing property when the ester is used in a large amount. However, transparency and haze of final product will be seriously influenced by addition of ester of montanic acid.

Normally, polyether-based TPU should be processed at a processing temperature (i.e., maximum melt temperature of TPU) of more than 200° C. in the injection molding to ensure a good product quality, such as low shrinkage and good surface appearance. In other words, if the processing temperature of TPU is less than 200° C., in particular less than 180° C., shrinkage and inhomogeneous surface of TPU product often happen. However, it is well known that when TPU is thermally processed at a melt temperature of more than 180° C., it will start thermal degrading. Especially if the material is not well pre-dried so that moisture remains in the material, the degradation of TPU will accelerate, and thus the mechanical properties of TPU products will be significantly reduced.

It is known that some plasticizers can be used to improve processability of TPU. EP 0134455B2 disclosed a soft polyether-based TPU with a Shore A hardness of lower than 80 comprising di(methoxyethyl)phthalate or phosphate ester, e.g. diphenyl cresyl phosphate, as a plasticizer. WO 2010/125009 disclosed a soft TPU comprising an ester of a tricarboxylic acid with one alcohol, e.g. acetyl tributyl citrate (ATBC), as a plasticizer. Hexanedioic acid 1,6-bis[2-(2-butoxyethoxy)ethyl]ester is also used as a plasticizer for polyether-based TPU. However, improvement of processability in particular demolding force in injection molding achieved by the plasticizers is not sufficient. Moreover, these plasticizers often lead to an increased abrasion loss and sometimes reduced mechanical properties of TPU through injection molding.

Therefore, it is desirable to find a processing auxiliary which can improve the processability, especially mold releasing force, of soft polyether-based TPU in injection molding process without such disadvantages as increased abrasion loss, and undesirably significant shrinkage and surface blooming of the final product.

Cyclohexane dicarboxylic acid alkylester is known as a plasticizer as described in CN100406428C, which is incorporated here as a reference.

WO 2008045637 discloses an in-situ production process for preparing a polyester TPU with a good low temperature snap back in presence of plasticizers, e.g., phthalate ester. It is mentioned that for applications that are sensitive from the toxicological point of view, such as children's toys and food contact, 1,2-cyclohexane dicarboxylic acid diisononyl ester may be used as the plasticizer.

US 2010/0286297 A1 discloses an application of cyclohexane dicarboxylic acid alkylester as an internal mold release agent for integral polyurethane foams.

JP2010163557A discloses a thermoplastic elastomer consisting of styrene type thermoplastic resin (A), a resin (B) selected from polyester type thermoplastic resin and polyurethane type thermoplastic resin, and cyclohexane dicarboxylic acid alkylester (C). It is said that the thermoplastic elastomer has excellent moldability, bleed-proof property, reduced stickiness and high adhesiveness.

However, the above-mentioned documents do not mention that cyclohexane dicarboxylic acid alkylester can improve processability of polyether-based TPU in injection molding process and meanwhile does not lead to increased abrasion loss and significant shrinkage and surface blooming of final product.

SUMMARY OF THE INVENTION

The object of the present invention is to overcome above shortcomings in prior art and provide a TPU composition with improved processability, especially reduced mold releasing force in injection molding process without such disadvantages as increased abrasion loss and undesirably significant shrinkage and surface blooming of final product.

This object has surprisingly been achieved by incorporating 1,2-cyclohexane dicarboxylic acid ester with formula (I)

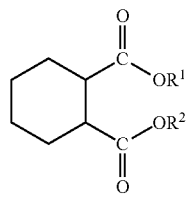

wherein $R^1$ and $R^2$ are independently selected from straight chain or branched alkyl having from 2 to 20, preferably from 5 to 16, more preferably 7 to 12, most preferably 8 to 10, carbon atoms, preferably 1,2-cyclohexane dicarboxylic acid diisononyl ester, into soft polyether-based TPU during or after preparation of the polyether-based TPU.

By incorporating the 1,2-cyclohexane dicarboxylic acid ester into soft polyether-based TPU, the injection molding behavior of the TPU and properties of the final product are significantly improved. Particularly, the force need to eject TPU product from mold cavity is reduced without increased abrasion loss and surface blooming. In addition, the TPU composition containing 1,2-cyclohexane dicarboxylic acid ester shows little shrinkage of final product even when it is injected at a processing temperature of less than 200° C., and even less than 180° C. compared to the conventional TPU without 1,2-cyclohexane dicarboxylic acid ester. Thereby, TPU material's thermal degradation can be avoided due to lower processing temperature. On the other hand, energy used in injection molding machine can also be significantly reduced.

In addition, the glass transition temperature of TPU composition can be reduced by incorporating the 1,2-cyclohexane dicarboxylic acid ester into polyether-based TPU.

Therefore, the present invention relates to the following aspects:

Item 1. A thermoplastic polyurethane composition, comprising (A) from 70 to 99.9% by weight, preferably 75 to 98% by weight, more preferably 80 to 97%, most preferably from 85 to 97% by weight, of at least one polyether-based thermoplastic polyurethane, and (B) from 0.1 to 30% by weight, preferably 2 to 25% by weight, more preferably 3 to 20% by weight and most preferably 3 to 15% by weight, of 1,2-cyclohexane dicarboxylic acid ester having formula (I):

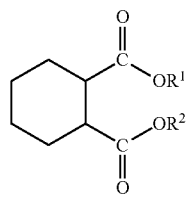

wherein $R^1$ and $R^2$ are independently selected from straight chain or branched alkyl having from 2 to 20, preferably from 5 to 16, more preferably 7 to 12, most preferably 8 to 10, carbon atoms, each based on the total weight of the thermoplastic polyurethane composition. The weight % refer to the total weight of the thermoplastic polyurethane composition.

Item 2. The thermoplastic polyurethane composition according to item 1, wherein the 1,2-cyclohexane dicarboxylic acid ester is 1,2-cyclohexane dicarboxylic acid diisononyl ester.

Item 3. The thermoplastic polyurethane composition according to item 1 or 2, wherein the sum of component (A) and component (B) is 100% by weight.

Item 4. The thermoplastic polyurethane composition according to any of items 1 to 3, wherein the polyether-based thermoplastic polyurethane comprises the following components: (a) one or more organic diisocyanates, (b) one or more polyols reactive toward isocyanate, which comprises 50-100% by weight polyether polyol, preferably 65-100% by weight, more preferably 85-100% by weight, particularly preferably 95-100% by weight, based on the total weight of the polyols, the polyether polyol having a number average molecular weight of from 500 g/mol to 5000 g/mol, preferably from 600 g/mol to 3000 g/mol, more preferably from 800 g/mol to 2500 g/mol, most preferably from 1000 g/mol to 2000 g/mol, and (c) one or more chain extenders having a molecular weight of from 60 g/mol to 500 g/mol, in polymerized form more preferable the chain extender has a molecular weight of from 60 g/mol to 499 g/mol without being polymerized and (d) optional catalysts, and/or (e) optional auxiliaries, and/or (f) optional additives.

Item 5. The thermoplastic polyurethane composition according to item 4, wherein the organic diisocyanate is selected from diphenylmethane 2,2'-diisocyanate, diphenylmethane 2,4'-diisocyanate, diphenylmethane 4,4'-diisocyanate, dicyclohexylmethane 4,4'-diisocyanate, 2,4'-diisocyanate, 2,2'-diisocyanate and combination thereof; and/or the polyether polyol is selected from hydroxyl group-containing polytetrahydrofuran having a number average molecular weight in the range from 600 g/mol to 2000 g/mol, preferably from 800 g/mol to 2000 g/mol, more preferably from 1000 g/mol to 2000 g/mol; and/or the chain extender is selected from 1,2-ethylenediol, 1,4-butanediol, 1,6-hexanediol and combination thereof.

Item 6. A process for preparing the thermoplastic polyurethane composition according to any of items 1 to 5, which comprises reacting component (a) with component (b) and component (c) in presence of the 1,2-cyclohexane dicarboxylic acid ester, and optional component (d), and/or optional component (e) and/or optional component (f), preferably at a temperature in range from 70° C. to 280° C., more preferably from 80° C. to 250° C., most preferably from 80° C. to 220° C., wherein component (a) is one or more organic diisocyanates, component (b) is one or more polyols reactive toward isocyanate, which comprises >50-100% by weight polyether polyol, preferably 65-100% by weight, more preferably 85-100% by weight, particularly preferably 95-100% by weight, based on the total weight of the polyols, the polyether polyol having a number average molecular weight of from 500 g/mol to 5000 g/mol, preferably from 600 g/mol to 3000 g/mol, more preferably from 800 g/mol to 2500 g/mol, most preferably from 1000 g/mol to 2000 g/mol, component (c) is one or more chain extenders having a molecular weight of from 60 g/mol to 500 g/mol, more preferable the chain extender has a molecular weight of from 60 g/mol to 499 g/mol without being polymerized, component (d) is optional catalysts, component (e) is optional auxiliaries, and component (f) is optional additives.

Item 7. A process for preparing the thermoplastic polyurethane composition according to any of items 1 to 5, which comprises mixing the polyether-based thermoplastic polyurethane with the 1,2-cyclohexane dicarboxylic acid ester at a temperature of generally from 80 to 150° C., preferably from 100 to 120° C.

Item 8. The process according to item 7, wherein the polyether based thermoplastic polyurethane is obtained by reacting component (a) with component (b) and component (c) in presence of optional component (d) and/or optional component (e) and/or optional component (f), preferably at a temperature in range from 70° C. to 280° C., more preferably from 80° C. to 250° C., most preferably from 80° C. to 220° C., wherein component (a) is one or more organic diisocyanates, component (b) is one or more polyols reactive toward isocyanate, which comprises >50-100% by weight polyether polyol, preferably 65-100% by weight, more preferably 85-100% by weight, particularly preferably 95-100% by weight, based on the total weight of the polyols, the polyether polyol having a number average molecular weight of from 500 g/mol to 5000 g/mol, preferably from 600 g/mol to 3000 g/mol, more preferably from 800 g/mol to 2500 g/mol, most preferably from 1000 g/mol to 2000 g/mol, based on total weight of the polyols, component (c) is one or more chain extenders having a molecular weight of from 60 g/mol to 500 g/mol more preferable the chain extender has a molecular weight of from 60 g/mol to 499 g/mol without being polymerized, component (d) is optional catalysts, component (e) is optional auxiliaries, and component (f) is optional additives.

Item 9. The process according to item 6 or 8, wherein the reaction is carried out by a reactive extrusion process, a belt line process or a handcast process.

EMBODIMENTS

The thermoplastic polyurethane composition of the invention comprises at least one polyether-based thermoplastic polyurethane in an amount of from 70 to 99.9% by weight, preferably 75 to 98% by weight, more preferably 80 to 97% by weight, most preferably from 85 to 97% by weight, based on the total weight of the thermoplastic polyurethane composition.

In a preferred embodiment, the polyether-based thermoplastic polyurethane is present as sole polymer component in the composition of the invention (namely, no other polymer component than the polyether-based thermoplastic polyurethane and possible polymers used as components (b)-(f) is present in the composition of the invention).

In another preferred embodiment, the sum of component (A) and component (B) is 100% by weight in the composition of the invention.

The thermoplastic polyurethane composition of the invention comprises 1,2-cyclohexane dicarboxylic acid ester with formula (I) in an amount of from 0.1 to 30% by weight, preferably 2 to 25% by weight, more preferably 3 to 20% and most preferably 3 to 15% by weight, based on the total weight of the thermoplastic polyurethane composition.

The 1,2-cyclohexane dicarboxylic acid ester used in the invention has formula (I)

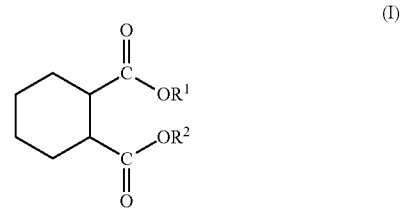

wherein $R^1$ and $R^2$ are independently selected from straight chain or branched alkyl having from 2 to 20, preferably from 5 to 16, more preferably 7 to 12, most preferably 8 to 10, carbon atoms. Preferably, $R^1$ and $R^2$ are independently selected from n-butyl, n-octyl, 2-ethylhexyl, isononyl, and isodecyl. Most preferred 1,2-cyclohexane dicarboxylic acid ester is 1,2-cyclohexane dicarboxylic acid diisononyl ester, for example Hexamoll® DINCH from BASF (abbreviated to "DINCH" hereafter).

In an embodiment of the invention, the polyether-based thermoplastic polyurethane comprises
  (a) one or more organic diisocyanates,
  (b) one or more polyols reactive toward isocyanate, which comprises 50-100% by weight of polyether polyol, preferably 65-100% by weight, more preferably 85-100% by weight, particularly preferably 95-100% by weight, based on the total weight of the polyols, the polyether polyol having a number average molecular weight of from 500 g/mol to 5000 g/mol, preferably from 600 g/mol to 3000 g/mol, more preferably from 800 g/mol to 2500 g/mol, most preferably from 1000 g/mol to 2000 g/mol, and
  (c) one or more chain extenders having a molecular weight of from 60 g/mol to 500 g/mol in polymerized form, more preferable the chain extender has a molecular weight of from 60 g/mol to 499 g/mol without being polymerized, and
  (d) optional catalysts, and/or
  (e) optional auxiliaries, and/or
  (f) optional additives.

The suitable components (a), (b), (c) and optional components (d), (e) and (f) used in the invention are described by way of examples in the following.

Suitable organic diisocyanates (a) are customary aliphatic, cycloaliphatic, araliphatic and/or aromatic isocyanates. Examples thereof include but are not limited to trimethylene, tetramethylene, pentamethylene, hexamethylene, heptamethylene and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, dicyclohexylmethane 4,4'-, 2,4'- and/or 2,2'-diisocyanate (H12MDI), diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethyldiphenyl diisocyanate, 1,2-diphenylethane diisocyanate, phenylene diisocyanate, and any combination thereof.

Diphenylmethane 2,2'-, 2,4'- and/or 4,4'-diisocyanate (MDI), and dicyclohexylmethane 4,4'-, 2,4'- and/or 2,2'-diisocyanate (H12MDI) are preferred. Diphenylmethane 2,2'-, 2,4'- and/or 4,4'-diisocyanate are particularly preferred.

In a particularly preferred embodiment, the organic diisocyanate (a) is an isocyanate mixture comprising at least 90% by weight, more preferably at least 95% by weight, further preferably at least 99% by weight 4,4'-diphenylmethane diisocyanates (4,4'-MDI), and other diisocyanates. These weight % refer to the total weight of the isocyanate mixture.

In the present invention, as component (b) which is reactive toward isocyanates, the polyols comprising 50-100% by weight polyether polyol, preferably 65-100% by weight, more preferably 85-100% by weight, particularly preferably 95-100% by weight, based on the total weight of the polyols, the polyether polyol having a number average molecular weight of from 500 g/mol to 5000 g/mol, preferably from 600 g/mol to 3000 g/mol, more preferably from 800 g/mol to 2500 g/mol, most preferably from 1000 g/mol to 2000 g/mol, is used.

It is possible to use polyether polyols, a mixture of two or more polyether polyols, or a mixture of polyether polyols and other polyols such as polyester polyols and/or polycarbonate diols as component (b). Polyether polyols, and a mixture of two or more polyether polyols are preferred.

In a case of using a mixture of polyether polyols and other polyols such as polyester polyols and/or polycarbonate diols, other polyols are used in amount of less than 50% by weight, preferably less than 35% by weight, more preferably less than 15% by weight, and most preferably less than 5% by weight, based on the total weight of the mixture.

Polyether diols, polyester diols and polycarbonate diols in the invention are those known commonly used in preparation of TPU.

The average functionality of polyols toward the isocyanate (a) refers to the average number of function groups in the polyols reactive to NCO group in the isocyanate. It is generally in the range from 1.7 to 2.3, preferably from 1.8 to 2.2, more preferably from 1.9 to 2.1, further preferably from 1.95 to 2.05, even more preferably from 1.98 to 2.02 and particularly preferably from 1.99 to 2.01, and is very particularly preferably 2.

The polyols (b) are particularly preferably linear hydroxyl-terminated polyols (b). Due to the method of production, these polyols (b) often comprise small amounts of nonlinear compounds. They are therefore frequently also referred to as "essentially linear polyols". Preference is given to polyether diols, and a mixture of polyether diols and polyester diols and/or polycarbonate diols.

Examples of polyether polyols include but are not limited to those based on generally known starter substances and customary alkylene oxides.

Suitable polyether polyols can be prepared by reacting one or more alkylene oxides having from 2 to 4 carbon atoms in the alkylene radical with an initiator molecule containing two active hydrogen atoms. Typical alkylene oxides are ethylene oxide, 1,2-propylene oxide, epichlorohydrin, and 1,2- and 2,3-butylene oxide. Ethylene oxide and mixtures of 1,2-propylene oxide and ethylene oxide are preferably utilized. The alkylene oxides can be used individually, alternately in succession or as mixtures. The typical starter molecules are, for example water, amino alcohols such as N-alkyldiethanolamines, and diols, ethyleneglycol, 1,3-propyleneglycol, 1,4-butanediol and 1,6-hexanediol. It is also possible to use mixtures of starter molecules. Suitable polyether polyols also include hydroxyl group-containing polymerization products of tetrahydrofuran.

Preferably used are hydroxyl group-containing polytetrahydrofuran, and co-polyether polyols of 1,2-proplyene oxide and ethylene oxide in which more than 50 percent of the hydroxyl groups are primary hydroxyl groups, preferably from 60 to 80 percent, and in which at least part of the ethylene oxide is a block in terminal position.

Most preferred polyether polyol is hydroxyl group-containing polytetrahydrofuran having a number average molecular weight in the range from 600 g/mol to 3000 g/mol, preferably from 800 g/mol to 2500 g/mol, more preferably from 1000 g/mol to 2000 g/mol.

Suitable polyester polyols can be prepared, for example, by reacting dicarboxylic acids having from 2 to 12 carbon atoms, preferably from 4 to 6 carbon atoms, with diols. Typical dicarboxylic acids are aliphatic dicarboxylic acids such as succinic acid, glutaric acid, adipic acid, suberic acid, azelaci acid and sebacic acid, and aromatic dicarboxylic acids such as phthalic acid, isophthalic acid, and terephthalic acid. The carboxylic acids can be utilized individually or in the form of mixtures, for example, a mixture of succinic acid, glutaric acid and adipic acid. Typical examples of diols are glycols having from 2 to 10 carbon atoms, preferably from 2 to 6 carbon atoms, such as ethylene glycol, diethylene glycol, 1,4-butanediol, 1,5-pentanediol, 1,6-hexanediol, 1,10-decanediol, 2,2-dimethyl-propane-1,3-diol, 1,3-propanediol, 2-methyl-1,3-propanediol and dipropylene glycol. The diols can be used individually or as mixtures. Preferably used polyester polyol is selected from a polymer based on adipic acid, butanediol and/or ethylene glycol, a polymer based on adipic acid, butanediol and hexanediol, and a polymer based on adipic acid, butanediol and 2-methyl-1,3-propanediol.

Suitable polyester polyols have a number average molecular weight ranging from 800 to 2500 g/mol, preferably from 1000 g/mol to 2000 g/mol.

As chain extenders (c), it is possible to use generally known aliphatic, araliphatic, aromatic and/or cycloaliphatic compounds having a molecular weight of from 60 g/mol to 500 g/mol, preferably the chain extender has a molecular weight of from 60 g/mol to 499 g/mol without being polymerized, more preferably from 60 g/mol to 400 g/mol, more preferably the chain extenders are selected from bifunctional compounds, for example diamines and/or alkane diols having from 2 to 10 carbon atoms in the alkylene radical, in particular 1,2-ethylene diol, 1,3-propanediol, 1,4-butanediol, 1,6-hexanediol and/or dialkylene-, trialkylene-, tetraalkylene-, pentaalkylene-, hexaalkylene-, heptaalkylene-, octaalkylene-, nonaalkylene- and/or decaalkyleneglycols having from 2 to 8 carbon atoms in alkylene moiety, preferably corresponding oliogopropyleneglycols and/or polypropyleneglycols. It is also possible to use mixtures of the chain extenders. Preference is given to 1,2-ethylenediol, 1,4-butanediol, 1,6-hexanediol or combination thereof as chain extender.

1,6-Hexanediol is widely known as a chain extender for TPU. TPU with 1,6-hexanediol as a chain extender can be processed at a low processing temperature. However, it is not suitable for injection grade TPU because hard phase formed therefrom with diphenylmethane diisocyanate (MDI) or other isocyanates has a relative bad crystallinity and is therefore difficult to achieve the suitable shape stability of final product through conventional injection molding process. This means the final TPU product is hard to eject from mold and the shape of product is unstable due to strong dimension shrinkage. The TPU with 1,6-hexanediol as a chain extender has a typical shrinkage parallel to melt flow more than 5% measured in accordance with ASTM D955-08 Specimem Type A. However, it is surprisingly found that when 1,2-cyclohexane dicarboxylic acid ester is incorporated as processing auxiliary, it is possible to obtain materials which can be easily demolded and the shrinkage ratio is reduced significantly even 1,6-hexanediol is used as a chain extender.

In a preferred embodiment, chain extender (c) is used in an amount of from 2% to 20% by weight, preferably from 5% to 15% by weight, based on the total weight of components (a), (b) and (c).

Suitable catalysts (d) which, in particular, accelerate the reaction between NCO groups of the organic diisocyanates (a) and the polyols (b) and component (c) are tertiary amines which are known and customary in the prior art, for example, triethylamine, dimethylcyclohexylamine, N-methylmorpholine, N,N'-dimethylpiperazine, 2-(dimethylaminoethoxy)ethanol, diazabicyclo[2.2.2]octane and the like, and also, in particular, organic metal compounds such as titanic esters, iron compounds such as iron (III) acetylacetonate, tin compounds, preferably tin diacetate, tin dioctoate, tin dilaurate or dialkyl tin salts of aliphatic carboxylic acids, e.g. preferably dibutyltin diacetate, dibutyltin dilaurate or the like, or Bismut salts derived from carbonic acids, preferably bismut octanoate.

The catalysts, if used, are usually used in amounts of from 0.0001 to 0.1 parts by weight per 100 parts by weight of polyols (b). Preference is given to tin catalysts, in particular tin dioctoate.

Apart from catalysts (d), customary auxiliaries (e) and/or additives (f) can be added, if desired, in addition to components (a) to (c). As auxiliaries (e), mention may be made by way of example of surface-active substances, flame retardants, nucleating agents, lubricant wax, dyes, pigments, and stabilizers, e.g. against oxidation, hydrolysis, light, heat or discoloration, and as additives (f), mention may be made by way of example of inorganic and/or organic fillers and reinforcing materials. As hydrolysis inhibitors, preference is given to oligomeric and/or polymeric aliphatic or aromatic carbodiimides. To stabilize TPU of the invention against aging, stabilizers can also be added to TPU. For the purposes of the present invention, stabilizers are additives which protect a plastic or a plastic mixture against damaging environmental influences. Examples are primary and secondary antioxidants, hindered amine light stabilizers (HALS), UV absorbers, hydrolysis inhibitors, quenchers and flame retardants. Commercial stabilizers such as BHT from Bayer, Irganox® series and Tinuvin® series from BASF are given in Plastics Additive Handbook, 5th Edition, H. Zweifel, ed., Hanser Publishers, Munich, 2001 ([1]), page 98-136.

If the TPU of the invention is exposed to thermooxidative damage during use, antioxidants can be added. Preference is given to phenolic antioxidants. Phenolic antioxidants such as Irganox® 1010 from BASF are given in Plastics Additive Handbook, 5th edition, H. Zweifel, ed., Hanser Publishers, Munich, 2001, pages 98-107 and page 116-page 121.

Preference is given to phenolic antioxidants whose molecular weight is between 600 g/mol and 2000 g/mol. An example of the phenolic antioxidant which is preferably used is 1:1 mixture of pentaerythrityl tetrakis(3-(3,5-bis(1,1-dimethylethyl)-4-hydroxyphenyl)propionate) and 3,3'-bis (3,5-di-tert-butyl-4-hydroxyphenyl)-n,n'-hexamethylenedipropionamide (Irganox® 1125, from BASF).

The phenolic antioxidants are generally used in concentrations of from 0.1% to 5% by weight, preferably from 0.1% to 2% by weight, in particular from 0.5% to 1.5% by weight, based on the total weight of TPU.

The TPU which are exposed to UV light are preferably additionally stabilized with a UV absorber. UV absorbers are generally known as molecules which absorb high-energy UV light and dissipate energy. Customary UV absorbers which are employed in industry belong, for example, to the group of cinnamic esters, diphenylcyan acrylates, formamidines, benzylidene malonates, diarylbutadienes, triazines and benzotriazoles. Examples of commercial UV absorbers may be found in Plastics Additive Handbook, 5th edition, H. Zweifel, ed, Hanser Publishers, Munich, 2001, pages 116-122.

In a preferred embodiment, the UV absorbers have a number average molecular weight of greater than 300 g/mol, in particular greater than 390 g/mol. Furthermore, the UV absorbers which are preferably used have a number average molecular weight of not more than 5000 g/mol, particularly preferably not more than 2000 g/mol.

Particularly useful UV absorbers are benzotriazoles. Examples of particularly suitable benzotriazoles are Tinuvin® 213, Tinuvin® 328, Tinuvin®571 and Tinuvin® 384 from BASF SE and also Eversorb®82 from Everlight Chemical. The UV absorbers can also be added in amounts of from 0.01 to 5% by weight, based on the total weight of the TPU, preferably 0.1-2.0% by weight, in particular 0.2-0.5% by weight, based on the total weight of TPU.

The above-described UV stabilizers based on an antioxidant and UV absorbers sometimes are not sufficient to ensure good stability of TPU against damaging influence of UV rays in some applications. In this case, a hindered amine light stabilizer (HALS) can be added in addition to antioxidant and UV absorber to TPU. The activity of HALS compounds is based on their ability to form nitroxyl radicals which intervene in mechanism of oxidation of polymers. HALSs are highly efficient UV stabilizers for most polymers.

HALS compounds are generally known and are commercially available. Examples of commercially available HALS may be found in Plastics Additive Handbook, 5th edition, H. Zweifel, Hanser Publishers, Munich, 2001, pages 123-136. As "hindered amine light stabilizers", preference is given to hindered amine light stabilizers having a number average molecular weight of greater than 0.5 kg/mol. Furthermore, the molecular weight of preferred HALS compounds should be not more than 10 kg/mol, particularly preferably not more than 5 kg/mol. Particularly preferred "hindered amine light stabilizers" are bis(1,2,2,6,6-pentamethylpiperidyl)sebacate (Tinuvin® 765, BASF SE) and the condensation product of 1-hydroxyethyl-2,2,6,6-tetramethyl-4-hydroxypiperidine and succinic acid (Tinuvin® 622). Very particular preference is given to the condensation product of 1-hydroxyethyl-2,2,6,6-tetramethyl-4-hydroxypiperidine and succinic acid (Tinuvin® 622), when the titanium content of the product is <150 ppm, preferably <50 ppm, in particular <10 ppm. HALS compounds are preferably used in a concentration of from 0.01 to 5% by weight, particularly preferably from 0.1 to 1% by weight, in particular from 0.15 to 0.3% by weight, based on the total weight of TPU.

A particularly preferred UV stabilizer comprises a mixture of a phenolic stabilizer, a benzotriazole and an HALS compound in the above-described preferred amounts.

Further details regarding the abovementioned auxiliaries and additives may be found in the specialist literature, e.g. in Plastics Additive Handbook, 5th edition, H. Zweifel, ed, Hanser Publishers, Munich, 2001.

All molecular weights specified in this text have the unit [g/mol] and relate, unless indicated otherwise, to the number average molecular weight (Mn).

To adjust the hardness of the TPU, component (b), which is reactive toward isocyanates and chain extenders (c) can be varied within a relatively wide range of molar ratios. Molar ratios of component (b) to the total of chain extenders (c) to be used of from 10:1 to 1:10, in particular from 1:1 to 1:4, have been found to be useful, with hardness of the TPU increasing with increasing content of (c).

The reaction preparing the TPU composition of the invention or the polyether-based TPU can be carried out at customary indexes, preferably at an index of from 0.6 to 1.2, more preferably at an index of from 0.8 to 1.1. The index is defined by the molar ratio of the total isocyanate groups of the component (a) used in the reaction to the groups which are reactive toward isocyanates, i.e. the active hydrogens, of components (b) and (c). At an index of 1.0, there is one active hydrogen atom, i.e. one function which is reactive toward isocyanates, of components (b) and (c) per isocyanate group of component (a). At indexes above 1.0, more isocyanate groups than OH groups are present.

The TPU composition comprising 1,2-cyclohexane dicarboxylic acid ester can be produced by two processes, namely "one-step" process and "two-step" process In a one-step process, 1,2-cyclohexane dicarboxylic acid ester is incorporated during preparation of TPU. TPU can be prepared by known processes in the art either continuously or batch-wise.

The one-step process for preparing the TPU composition of the invention comprises reacting component (a) with (b) and (c) in presence of 1,2-cyclohexane dicarboxylic acid ester, and optional component (d) and/or optional component (e) and/or optional component (f). The reaction conditions such as reaction temperature are substantially same as those for preparing TPU through one-step method. For example, the reaction can carried out at a temperature in range from 70° C. to 280° C., preferably from 80° C. to 250° C., more preferably from 80° C. to 220° C.

Specific method includes but is not limited to a reactive extrusion process, a belt line process, a hand-cast process or other known method for preparing TPU in the art. In the one-step process, the components (a), (b), (c) and 1,2-cyclohexane dicarboxylic acid ester, and optional component (d) and/or optional component (e) and/or optional component (f) are mixed with one another either successively or simultaneously, with the reaction commencing immediately. Preferably, 1,2-cyclohexane dicarboxylic acid ester is mixed with component (b) and then the mixture is mixed with other components. In another preferable embodiment, component (b), (c) and optional (d) and/or optional (e) and/or optional (f) are mixed together then the mixture is mixed with component (a), subsequently the mixture is mixed with 1,2-cyclohexane dicarboxylic acid ester.

In the one-step process through a reactive extrusion process, the components (a), (b) and (c) and 1,2-cyclohexane dicarboxylic acid ester, and optional component (d) and/or optional component (e) and/or optional component (f) are introduced individually or as a mixture into a extruder and react at a temperatures of from 100° C. to 280° C., preferably from 140° C. to 250° C., and more preferably from 160° C. to 220° C. The TPU obtained is extruded and then granulated in a manner known in the art. The preferred extruder used in the one-step is a twin-screw extruder commonly used in the art.

In the one-step process through a hand-cast process, all components of the TPU composition are mixed in a mixing chamber at temperatures from 70° C. to 150° C., preferably from 80° C. to 125° and react to form the desired TPU composition.

In the one-step process through a belt line process, all components of the TPU composition are mixed and placed on a belt line to react at a temperatures of from 100° C. to 280° C., preferably from 130° C. to 220° C., and is subsequently processed to form granulates. For this, an extruder can be connected directly to the belt line unit and melt and extrude the TPU at a temperatures of from 120° C. to 250° C., preferably from 150° C. to 230° C. to form a strand. The strand can be mechanically broken up to form granulates. In an alternative embodiment, the strand is directly chopped, preferably under water, as exiting melt at the die plate of the extruder.

The TPU composition of the invention can also be produced in a "two-steps" process comprising mixing the polyether-based thermoplastic polyurethane with 1,2-cyclohexane dicarboxylic acid ester, preferably at a temperature in a range from 80 to 150° C., preferably from 100 to 120° C. The mixture time is generally from 10 to 36 hours, preferably 20 to 24 hours.

In the two-step process, the polyether-based thermoplastic polyurethane is firstly produced through above mentioned one-step process except that 1,2-cyclohexane dicarboxylic acid ester is not added. The finished TPU is first preheated to from 100 to 120° C. and preferably kept at the temperature for a period of time, for example 2 hours, then 1,2-cyclohexane dicarboxylic acid ester is mixed with the preheated TPU granulates in a closed container. Further, the mixture is annealed at a temperature of generally from 80 to 150° C., preferably from 100 to 120° C., for generally 10 to 36 hours, preferably 20 to 24 hours. The polyether-based thermoplastic polyurethane suitable for the invention can also be commercial available products such as Elastollan® 1185A10 and Elastollan® 1190A10 from BASF.

The TPU composition of the invention is suitable for injection molding with advantages of reduced mold releasing force without significant abrasion loss and shrinkage and surface blooming of the final product. The maximum temperature of the polymer melt in the injection molding process can be from 150° C. to 220° C., preferably from 160° C. to 200° C. The mold temperature is from 10° C. to 50° C., preferably from 20° C. to 40° C.

In addition, the TPU composition of the invention can also be processed by customary processes, e.g. calendering, blow molding, powder sintering or extrusion.

The TPU composition of the invention is usually present as granulates or in powder form and can be processed to give products such as films, fibers, coatings, damping elements, seals, bellows, and flooring for buildings, non-woven tissues, cables, cable plugs, cable sheathing, cushion, laminates, profiles, belts, rollers, hoses, towing cables, shoe soles, solar modules, plug connections, trim in automobiles or wiper blades, with preference being given to automobile parts, fibers, films, cables, hoses or shoes. Furthermore, the thermoplastic polyurethane composition of the invention can be used as modifier for thermoplastic materials.

In addition, a and/or physical blowing agent or a gas can be introduced into the thermoplastic polyurethane composition of the invention. Foamed products are produced in this way.

The thermoplastic polyurethane composition of the present invention has a hardness of generally less than Shore A 98, in particular from Shore A 40 to Shore A 95 in accordance with DIN 53505. Preferably, the thermoplastic polyurethane composition of the present invention has a density in a range from 1.0 g/cm$^3$ to 1.3 g/cm$^3$. The tensile strength of the TPU composition in accordance with DIN 53504 is more than 10 MPa, preferably more than 15 MPa, particularly preferably more than 20 MPa. The TPU composition of the invention has an abrasion loss in accordance with DIN 53516 of generally less than 150 mm$^3$, preferably less than 100 mm$^3$.

EXAMPLES

The invention is further illustrated but is not intended to be limited by the following examples in which all parts and percentages are by weight unless otherwise specified.

The thermoplastic polyurethane (abbreviation "TPU" herein) granulates produced in the following examples were processed by an injection molding machine (Arburg 420 C) to give standard test plaques (a 120 mm length×95 mm width×2 mm thick test body connecting to a 60 mm length× 30 mm width×6 mm thick test body in accordance with the standard mold from Hasco), and S2 test bars (in accordance with DIN 53504) stamped out of the test plaques were subjected to mechanical tests. The Shore hardness of samples was measured in accordance with DIN 53505, the tensile strength and elongation at break of samples were measured in accordance with DIN 53504, the tear strength of samples was measured in accordance with DIN ISO 34-1Bb, the abrasion loss was measured in accordance with DIN 53516, and the yellowness index is measured in accordance with ASTM E 313. The total cycle time was in this case recorded when the sample was smoothly released from the mold.

The surface blooming was evaluated by sight and hand check.

The glass transition temperature of TPU was determined by Dynamic Mechanical Analysis (DMA) at the peak of torsion loss modulus (G") in accordance of ISO 6721.

In order to measure a demolding force, the TPU granulates produced in the following examples was processed by an injection molding machine (DEMAG ergotech 200/500-610) to give an O-ring shape test body. The demolding force was measured by a force sensor in the machine during an O-ring shape body was ejected from the mold cavity. The larger demolding force corresponds to larger stickiness between TPU material and mold cavity surface, namely the harder releasing the TPU final product from the mold. All the measurements were carried out at the same processing condition: cycle time (104 seconds), zone 1-4 temperature (200° C., 205° C., 210° C., 210° C.), nozzle temperature 215° C., mold temperature 40° C., and back pressure 100 bar. Since the cycle time was fixed, the demolding force as the peak force to eject the O-ring from the mold was variable so that the automatic ejection of product can be realized.

In order to measure a shrinkage ratio of TPU final product, the TPU granulates produced in the following examples was processed by an injection molding machine (Arburg 420 C) with a test specimen mold. From the mold a test body of a 60.0 mm length×60.0 mm width×2.0 mm thick specimen can be injected. The original flow direction length of the mold ($L_m$) is 60.0 mm, the length of the injected specimen without annealing was measured at 24 hours after injection molding as $L_1$, and the length of the injected test plate with 100° C./20 hours annealing was measured at 24 hours after annealing as $L_2$. According to ASTM D 955-08, Specimen Type A, the shrinkage parallel to flow of non-annealed product $S_1=(L_m-L_1)/L_m\times100\%$ and the linear shrinkage of annealed product $S_2=(L_m-L_2)/L_m\times100\%$. All the measurements were carried out at the same processing conditions: zone 1-4 temperature (175° C., 180° C., 180° C., 180° C.), nozzle temperature 180° C. and mold temperature 40° C.

Example 1

Polyether-Based TPU Compositions Comprising Different Auxiliaries Produced by "One-Step" Reactive Extrusion Process Sample 1.1 480.0 g diphenylmethane 4,4'-diisocyanate (Lupranat® MDI from BASF, abbreviated to "MDI" hereafter), 101.5 g 1,4-butanediol (BDO from BASF, same below) and 800.0 g polytetrahydrofuran having a number average molar mass of 1000 g/mol (PTHF 1000 from BASF, same in below) and 13.9 g a 1:1 mixture of pentaerythrityl tetrakis(3-(3,5-bis(1,1-dimethylethyl)-4-hydroxyphenyl)propionate) and 3,3'-bis(3,5-di-tert-butyl-4-hydroxyphenyl)-N,N'-hexamethylenedipropionamide (Irganox® 1125 from BASF) as an antioxidant were processed through a twin screw reactive extruder. In this process, all components except MDI were preheated to 165° C. and fed into the first barrel of a ZSK 58 twin-screw extruder from Werner & Pfleiderer. Then, MDI preheated to 65° C. was fed into the first barrel of the extruder. The rotation rate of the twin-screw system was 200 rpm. The temperatures of barrel sections of the screw were set as 170-220° C.

Sample 1.2: The preparation of Sample 1.1 was repeated except that 73.5 g (5% by weight based on a total weight of the TPU composition, same in below) diphenyl cresyl phosphate (Disflamoll® DPK from Lanxess, abbreviated to "DPK" hereafter) was added during feeding of the other components than MDI in Sample 1.1.

Sample 1.3: The preparation of Sample 1.1 was repeated except that 155.3 g (10% by weight, based on a total weight of the TPU composition, same in below) DPK was added during feeding of the other components than MDI in Sample 1.1.

Sample 1.4: The preparation of Sample 1.1 was repeated except that 246.9 g (15% by weight) DPK was added to the formation from sample 1 during feeding of the other components than MDI in Sample 1.1.

Sample 1.5: The preparation of Sample 1.1 was repeated except that 73.5 g (5% by weight) 1,2-cyclohexane dicarboxylic acid diisononyl ester (Hexamoll® DINCH from BASF, abbreviated to "DINCH" hereafter) was added during feeding of the other components than MDI in Sample 1.1.

Sample 1.6: The preparation of Sample 1.1 was repeated except that 155.3 g (10% by weight) DINCH was added during feeding of the other components than MDI in Sample 1.1.

Sample 1.7: The preparation of Sample 1.1 was repeated except that 246.9 g (15% by weight) DINCH was added during feeding of the other components than MDI in Sample 1.1.

Sample 1.8: The preparation of Sample 1.1 was repeated except that 155.3 g (10% by weight) butyl benzyl phthalate (Unimoll® BB from Lanxess) was added during feeding of the other components than MDI in Sample 1.1.

In order to measure mechanical properties, the TPU granulates produced in this way were molded by injection molding to give test plaques and S2 test bars (in accordance with DIN 53504) stamped out of the test plaques were subjected to mechanical tests. The maximum temperature of melt in injection molding was 195° C.

TABLE 1

Mechanical properties and mold releasing behavior

| Sample | 1.1 | 1.2 | 1.3 | 1.4 | 1.5 | 1.6 | 1.7 | 1.8 |
|---|---|---|---|---|---|---|---|---|
| Processing auxiliary | no | 5 wt % DPK | 10 wt % DPK | 15 wt % DPK | 5 wt % DINCH | 10 wt % DINCH | 15 wt % DINCH | 10 wt % Unimoll BB |
| Shore hardness, A | 84 | 81 | 78 | 73 | 81 | 80 | 75 | 80 |
| Tensile strength, MPa | 25 | 21 | 20 | 16 | 20 | 22 | 17 | 21 |
| Elangation at break, % | 750 | 760 | 800 | 850 | 790 | 840 | 930 | 770 |
| Tear strength, kN/m | 47 | 41 | 35 | 30 | 39 | 40 | 32 | 40 |
| Abrasion loss, $mm^3$ | 86 | 124 | 138 | 188 | 116 | 95 | 88 | 126 |
| Yellowness Index | 3.2 | 3.9 | 3.8 | 4.7 | 3 | 3.1 | 3.3 | N.A. |
| Demolding force, N | 15500 | 13500 | 13500 | 12500 | 11500 | 4300 | 1500 | 14000 |
| Percentage of demolding force relative to virgin sample | 100% | 87% | 87% | 81% | 74% | 28% | 10% | 90% |

All samples had no surface blooming after placing in room temperature for 2 weeks, annealing at 100° C. for 2 hours, or annealing 90° C. for 2 weeks, respectively. However, the samples containing DINCH showed relatively lower yellowness index.

Example 2

Polyether-Based TPU Compositions with Substantially Same Hardness Comprising Different Auxiliaries Produced by "One-Step" Belt Line Process Sample 2.1: 500.0 g MDI, 90.9 g BDO, 1000.0 g PTHF1000, and 16.1 g Irganox® 1125 were mixed and processed through a belt line process to obtain TPU granulates. In this process, all the components were preheated at 80° C. and then thoroughly mixed in a mixing pot. When the reaction mixture reached at a temperature of 90-95° C., it was poured onto a continuous conveyor belt at a temperature of 130-170° C. and formed a TPU sheet after 5-15 minutes on the belt. The continuously produced TPU sheet was comminuted and homogenized in a comminution and homogenization apparatus at the end of belt. The homogenized dice was subsequently melted in a single screw extruder with zone temperature of between 170° C. to 230° C., and finally granulated by an underwater granulator.

Sample 2.2: The preparation of Sample 2.1 was repeated except that 2.4 g lubricant EBS (N,N'-ethylenebis-stearylamide) (0.15% by weight referring to the total weight of thermoplastic polyurethane) was added during mixture of the components in Sample 2.1.

Sample 2.3: 600.0 g MDI, 126.9 g BDO, 1000.0 g PTHF1000, 18.4 g Irganox® 1125 and 91.9 g (5% by weight referring to the total weight of thermoplastic polyurethane) DPK were mixed and processed through a belt line process in the same way as Sample 2.1 to synthesize TPU.

Sample 2.4: The preparation of Sample 2.3 was repeated except that 91.9 g (5% by weight referring to the total weight of thermoplastic polyurethane) DPK was replace with 91.91 g (5% by weight referring to the total weight of thermoplastic polyurethane) DINCH.

Sample 2.5: 600.0 g MDI, 126.9 g BDO, 1000.0 g PTHF1000, 19.4 g of Irganox® 1125 and 194.1 g (10% by weight referring to the total weight of thermoplastic polyurethane) DINCH were mixed and processed through a belt line in the same way as Sample 2.1 to synthesize TPU.

In order to measure mechanical properties, the TPU granulates produced in this way were molded by injection molding to give test plaques and S2 test bars (in accordance with DIN 53504) stamped out of the test plaques were subjected to mechanical tests. The maximum temperature of melt in injection molding was 195° C.

TABLE 2

Hardness and mold releasing behavior

| | Sample | | | | |
|---|---|---|---|---|---|
| | 2.1 | 2.2 | 2.3 | 2.4 | 2.5 |
| Processing auxiliary | No | 0.15 wt % EBS | 5 wt % DPK | 5 wt % DINCH | 10 wt % DINCH |
| Hardness, A | 80 | 80 | 81 | 81 | 80 |
| Demolding force, N | 15500 | 11000 | 13500 | 10500 | 4000 |
| Percentage of demolding force relative to virgin sample | 100% | 71% | 87% | 68% | 26% |
| Surface blooming (after 100° C./20 hours annealing) | No | Yes | No | No | No |

TABLE 3

Shrinkage

| | Sample | | | | |
|---|---|---|---|---|---|
| | 2.1 | 2.2 | 2.3 | 2.4 | 2.5 |
| Processing auxiliary | No | 0.15 wt % EBS | 5 wt % DPK | 5 wt % DINCH | 10 wt % DINCH |
| $S_1$ (shrinkage non-annealed) | 4.2% | 3.3% | 2.5% | 2.5% | 2.5% |
| $S_2$ (shrinkage annealed) | 5.8% | 5.8% | 3.3% | 3.3% | 3.3% |

It showed that at the same hardness, the TPU comprising DINCH had significantly reduced demolding force and lowered shrinkage without surface blooming.

Example 3

Polyether-Based TPU Compositions Comprising Different Auxiliaries Produced by "Two-Steps" Process Sample 3.1: 630.0 g MDI, 180.6 g 1,6-hexanediol (HDO from BASF), 1000.0 g PTHF 1000 and 9.1 g Irganox®

1125 were mixed and processed through a belt line process in the same way as Sample 2.1 to obtain TPU granulates.

Sample 3.2: 533.5 g MDI, 135.0 g HDO, 1000.0 g PTHF 1000 and 8.4 g Irganox® 1125 were mixed and processed in the same way as Sample 2.1 through a belt line process to obtain TPU granulates.

Sample 3.3: 1910.0 g Sample 3.1 was preheated at 120° C. for 2 hours, then 90.0 g (4.5 wt %) of DINCH was mixed with the heated granulates thoroughly. The mixture was then put into a closed container and annealed at 80° C. for 20 hours. Then the TPU granulates containing DINCH was cooling down and ready for injection molding.

Sample 3.4: 1910.0 g Sample 3.1 was preheated at 120° C. for 2 hours, then 90.0 g (4.5 wt % by total TPU weight) of ATBC (Citrofol® BII from Jungbunzlauer) was mixed with the heated granulates thoroughly. The mixture was then put into a closed container and annealed at 80° C. for 20 hours. Then the TPU granulates containing ATBC was cooling down and ready for injection molding.

Sample 3.5: 1910.0 g Sample 3.1 was preheated at 120° C. for 2 hours, then 90.0 g (4.5 wt % by total TPU weight) of hexanedioic acid 1,6-bis[2-(2-butoxyethoxy)ethyl]ester (RS107 from Adeka) was mixed with the heated granulates thoroughly. The mixture was then put into a closed container and annealed at 80° C. for 20 hours. Then the TPU granulates containing RS107 was cooling down and ready for injection molding.

In order to measure mechanical properties, the TPU granulates produced in this way were molded by injection molding to give test plaques and S2 test bars (in accordance with DIN 53504) stamped out of the test plaques were subjected to mechanical tests. The maximum temperature of melt in injection molding was 175° C.

TABLE 4 shrinkage and total cycle time

| | Sample | | | | |
|---|---|---|---|---|---|
| | 3.1 | 3.2 | 3.3 | 3.4 | 3.5 |
| Processing auxiliary | 0 | 0 | 4.5 wt % DINCH | 4.5 wt % ATBC | 4.5 wt % RS107 |
| Shore Hardness, A | 85 | 81 | 81 | 81 | 80 |
| $S_1$ (shrinkage non-annealed) | 6.7% | 7.5% | 5% | 4.2% | 6.7% |
| $S_2$ (shrinkage annealed) | 7.5% | 8.3% | 5.8% | 5.8% | 8.3% |
| Total cycle time, s | 72 | 81 | 72 | 102 | 91 |

It showed that at the same hardness, the TPU comprising DINCH had significantly reduced cycle time and lowered shrinkage even when 1,6-hexanediol was used as a chain extender and the TPU was processed at less than 180° C.

Example 4

Polyether-Based TPU Compositions Comprising DINCH Produced by "One-Step" Process Sample 4.1: 850.0 g MDI, 288.5 g 1,6-hexanediol (HDO from BASF), 1000.0 g PTHF 1000 and 10.8 g Irganox® 1125 were processed through a reactive extrusion process in the same way as Sample 1.1 to obtain TPU granulates.

Sample 4.2: 980.0 g MDI, 345.9 g HDO, 1000.0 g PTHF 1000, 12.3 g Irganox® 1125 and 123.1 g (5% by weight referring to the total weight of thermoplastic polyurethane) DINCH were processed through a reactive extrusion process in the same way as Sample 1.1 to obtain TPU granulates.

In order to measure mechanical properties, the TPU granulates produced in this way were molded by injection molding to give test plaques and S2 test bars (in accordance with DIN 53504) stamped out of the test plaques were subjected to mechanical tests. The maximum temperature of the melt in the injection molding was 175° C.

TABLE 5 shrinkage and cycle time

| | Sample | |
|---|---|---|
| | 4.1 | 4.2 |
| Processing auxiliary | 0 wt % | 5 wt % DINCH |
| Shore Hardness, A | 93 | 94 |
| $S_1$ (shrinkage non-annealed) | 5.8% | 3.3% |
| $S_2$ (shrinkage annealed) | 6.7% | 3.3% |
| Total cycle time, s | 72 | 63 |

The results revealed that if DINCH was added, both cycle time of injection molding and shrinkage of the TPU product could be improved significantly even when 1,6-hexanediol was used as a chain extender and the TPU was processed at less than 180° C.

Example 5

Polyether-Based TPU Compositions Comprising DINCH Produced by "One-Step" Handcast Process Sample 5.1: 372.0 g MDI, 46.1 g 1,2-ethylene diol (EDO from BASF), 500.0 g PTHF 1000, 500.0 g polytetrahydrofuran having a number average molar mass of 2000 g/mol (PTHF 2000 from BASF) and 0.8 g lubricant EBS were mixed at 85° C. When the reaction mixture temperature was ramped to 110° C., the mixture was cast onto a preheated hot plate of 125° C. for 10 minutes. The produced TPU plate was then annealed at 80° C. for 15 hours and finally crashed to TPU granulates.

Sample 5.2: 324.2 g MDI, 34.2 g EDO, 500.0 g PTHF1000, 500.0 g PTHF 2000, 0.8 g lubricant EBS and 151.8 g (10% by weight referring to the total weight of thermoplastic polyurethane) DINCH were mixed at 85° C. When the reaction mixture temperature was ramped to 110° C., the mixture was cast onto a preheated hot plate of 125° C. for 10 minutes. The produced TPU plate was then annealed at 80° C. for 15 hours and finally crashed to TPU granulates Sample 5.3: 324.0 g MDI, 33.0 g EDO, 500.0 g PTHF 1000, 500.0 g PTHF 2000, 0.9 g lubricant EBS and 341.4 g (20% by weight referring to the total weight of thermoplastic polyurethane) DINCH were mixed at 85° C. When the reaction mixture temperature was ramped to 110° C., the reaction mixture was cast onto a preheated hot plate of 125° C. for 10 minutes The produced TPU plate was then annealed at 80° C. for 15 hours and finally crashed to TPU granulates.

In order to measure mechanical properties, the TPU granulates produced in this way were molded by injection molding to give test plaques and S2 test bars (in accordance with DIN 53504) stamped out of the test plaques were subjected to mechanical tests. The maximum temperature of the melt in the injection molding was 205° C.

TABLE 6

Mechanical properties

| | Sample | | |
|---|---|---|---|
| | 5.1 | 5.2 | 5.3 |
| DINCH | 0 wt % | 10 wt % | 20 wt % |
| Shore hardness, A | 63 | 50 | 41 |
| Tensile strength, MPa | 24 | 19 | 23 |
| Abrasion loss, cm$^3$ | 64 | 62 | 51 |
| Tg, ° C. | −58 | −63 | −68 |
| Blooming after annealing (20 hours 100° C.) | No | no | no |

Example 6

Aliphatic Polyether-Based TPU Compositions Comprising DINCH Produced by "One-Step" Handcast Process Sample 6.1: 841.7 g dicyclohexylmethane diisocyanate (H12MDI), 226.1 g BDO and 700.0 g PTHF1000 were mixed at 80° C. When the reaction mixture temperature was ramped to 110° C., the mixture was cast onto a preheated hot plate of 125° C. for 10 minutes. The produced TPU plate was then annealed at 80° C. for 15 hours and finally crashed to TPU granulates.

Sample 6.2: The preparation of Sample 6.1 was repeated except that 93.5 g (5% by weight referring to the total weight of thermoplastic polyurethane) DINCH was added during mixture of the components in Sample 6.1.

Sample 6.3: The preparation of Sample 6.1 was repeated except that 196.9 g (10% by weight referring to the total weight of thermoplastic polyurethane) DINCH was added during mixture of the components in Sample 6.1.

The TPU granulates produced in this way were molded by injection molding to give test plaques and S2 test bars (in accordance with DIN 53504) stamped out of the test plaque were subjected to mechanical tests. The maximum temperature of the melt in the injection molding was 210° C.

TABLE 7

Mechanical properties

| | Sample | | |
|---|---|---|---|
| | 6.1 | 6.2 | 6.3 |
| DINCH | 0 | 5 wt % | 10 wt % |
| Shore Hardness, D | 52 | 44 | 38 |
| Tensile strength, MPa | 40 | 40 | 43 |
| Elongation at break, % | 420 | 430 | 540 |
| Tear strength, kN/m | 122 | 103 | 95 |
| Abrasion loss, mm$^3$ | 62 | 56 | 51 |
| Tg, ° C. | 22 | 12 | 6 |
| Blooming after annealing (20 hours 100° C.) | no | no | no |

The results reveal that both abrasion loss and glass transition temperature of TPU could be reduced significantly by incorporating DINCH into aliphatic polyether-based TPU.

Example 7

Polyether-Based TPU Compositions Based on EO/PO Polyether Polyol with DINCH Produced by "One-Step" Handcast Process Sample 7.1: 630.0 g MDI, 165.2 g BDO and 1000.0 g EO/PO Polyetherol having a number average molar weight of 1700 g/mol (Lupraphen VP9317 from BASF) and 18.2 g Irganox® 1125 were mixed at 80° C. When the temperature of the mixture was ramped to 110° C., the mixture was cast onto a preheated hot plate of 125° C. for 10 minutes. The produced TPU plate was then annealed at 80° C. for 15 hours and finally crashed to TPU granulates.

Sample 7.2: 730.0 g MDI, 202.7 g BDO and 1000.0 g VP9317, 21.7 g Irganox® 1125 and 205.1 g (10% by weight referring to the total weight of thermoplastic polyurethane) DINCH were mixed at 80° C. When the temperature of the mixture was ramped to 110° C., the mixture was cast onto a preheated hot plate of 125° C. for 10 minutes. The produced TPU plate was then annealed at 80° C. for 15 hours and finally crashed to TPU granulates.

In order to measure mechanical properties, the TPU granulates produced in this way were molded by injection molding to give test plaques and S2 test bars (in accordance with DIN 53504) stamped out of the test plaques were subjected to mechanical tests. The maximum temperature of the melt in the injection molding was 190° C.

TABLE 8

Mechanical properties and mold releasing behavior

| | Sample | |
|---|---|---|
| | 7.1 | 7.2 |
| DINCH | 0 wt % | 10 wt % |
| Shore hardness, A | 87 | 87 |
| Tensile strength, MPa | 29 | 21 |
| Elongation at break, % | 610 | 580 |
| Tear strength, kN/m | 39 | 33 |
| Abrasion loss, mm$^3$ | 67 | 65 |
| Tg, ° C. | −43 | −53 |
| Cycle time, s | 85 | 78 |

Example 8

Polyether-Based TPU Compositions Produced by "One-Step" Belt Line Process

Sample 8.1: 375.0 g MDI, 68.2 BDO, 510 g PTHF1000, 490.0 g polyester polyol having a number average molar mass of 2000 g/mol (Lupraphen VP9332), 3.6 g Irganox® 1125 and 4.4 g EBS were mixed and processed through a belt line process in the same way as Sample 2.1 to obtain TPU granulates.

Sample 8.2: 375.0 g MDI, 68.2 BDO, 510 g PTHF1000, 490.0 g Lupraphen VP9332, 3.8 g Irganox® 1125 and 76.2 g (5% by weight referring to the total weight of thermoplastic polyurethane) DINCH were mixed and processed through a belt line process in the same way as Sample 2.1 to obtain TPU granulates.

Sample 8.3: 375.0 g MDI, 68.2 BDO, 510 g PTHF1000, 490.0 g Lupraphen VP9332, 4.0 g Irganox® 1125 and 160.8 g (10% by weight referring to the total weight of thermoplastic polyurethane) DINCH were mixed and processed through a belt line process in the same way as Sample 2.1 to obtain TPU granulates.

The TPU granulates produced in this way were molded by injection molding to give test plaque and S2 test bars (in accordance with DIN 53504) stamped out of the test plaque were subjected to mechanical tests. The maximum temperature of the melt in the injection molding was 205° C.

TABLE 9

Mechanical properties and mold releasing behavior

|  | Sample | | |
| --- | --- | --- | --- |
|  | 8.1 | 8.2 | 8.3 |
| DINCH | 0 wt % | 5 wt % | 10 wt % |
| Shore hardness, A | 79 | 76 | 73 |
| Tensile strength, MPa | 53 | 50 | 49 |
| Elongation at break, % | 530 | 550 | 570 |
| Tear strength, kN/m | 42 | 40 | 42 |
| Abrasion loss, mm$^3$ | 35 | 32 | 30 |
| Blooming after annealing (20 hours 100° C.) | yes | no | No |
| Cycle time, s | 104.5 | 98 | 95 |

The invention claimed is:

1. A thermoplastic polyurethane composition, comprising from 70 to 99.9% by weight, based on the total weight of the thermoplastic polyurethane composition, of a polyether-based thermoplastic polyurethane; and
from 0.1 to 4.0% by weight, based on the total weight of the thermoplastic polyurethane composition, of a 1,2-cyclohexane dicarboxylic acid ester represented by formula (I):

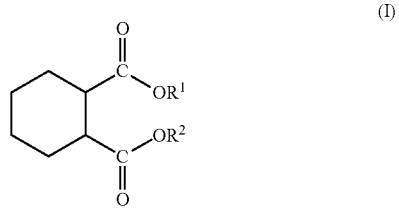

wherein $R^1$ and $R^2$ are each independently a straight chain or a branched alkyl comprising from 8 to 10 carbon atoms, each based on a total weight of the thermoplastic polyurethane composition,
wherein the polyether-based thermoplastic polyurethane comprises:
an organic diisocyanate,
a polyol reactive toward isocyanate, and
a chain extender,
wherein the organic diisocyanate is at least one selected from the group consisting of diphenylmethane 2,2'-diisocyanate, diphenylmethane 2,4'-diisocyanate, diphenylmethane 4,4'-diisocyanate, dicyclohexylmethane 4,4'-diisocyanate, 2,4'-diisocyanate, and 2,2'-diisocyanate,
wherein the polyol reactive toward isocyanate is a polytetrahydrofuran comprising a hydroxyl group and having a number average molecular weight of from 600g/mol to 2000g/mol, and
wherein the chain extender is at least the one member selected from the group consisting of 1,2-ethylenediol, 1,4-butanediol, and 1,6-hexanediol.

2. The thermoplastic polyurethane composition according to claim 1, wherein the 1,2-cyclohexane dicarboxylic acid ester is 1,2-cyclohexane dicarboxylic acid diisononyl ester.

3. The thermoplastic polyurethane composition according to claim 1, wherein a sum of the polyether-based thermoplastic polyurethane and the 1,2-cyclohexane dicarboxylic acid ester is 100% by weight.

4. The thermoplastic polyurethane composition according to claim 1, comprising from 75 to 98% by weight of the polyether-based thermoplastic polyurethane and from 2 to 4.0% by weight of the 1,2-cyclohexane dicarboxylic acid ester.

5. The thermoplastic polyurethane composition according to claim 1, comprising from 80 to 97% by weight of the polyether-based thermoplastic polyurethane and from 3 to 4.0% by weight of the 1,2-cyclohexane dicarboxylic acid ester.

6. The thermoplastic polyurethane composition according to claim 1, wherein the polyether-based thermoplastic polyurethane further comprises at least one member selected from the group consisting of:
a catalyst,
an auxiliary, and
an additive.

7. The thermoplastic polyurethane composition according to claim 1, wherein the polyol comprises 65-100% by weight of polyether polyol.

8. The thermoplastic polyurethane composition according to claim 1, wherein the polyol comprises 85-100% by weight of polyether polyol.

9. The thermoplastic polyurethane composition according to claim 1, wherein the polyether polyol has a number average molecular weight of from 800 g/mol to 2000 g/mol.

10. The thermoplastic polyurethane composition according to claim 6, comprising from 85 to 97% by weight of the polyether-based thermoplastic polyurethane and from 3 to 4.0% by weight of the 1,2-cyclohexane dicarboxylic acid ester.

11. A process for preparing the thermoplastic polyurethane composition according to claim 1, the process comprising
reacting an organic diisocyanate with a polyol and a chain extender in presence of the 1,2-cyclohexane dicarboxylic acid ester, and optionally in the presence of a catalyst, an auxiliary, an additive, or any combination thereof.

12. A process for preparing the thermoplastic polyurethane composition according to claim 1, the process comprising
mixing the polyether-based thermoplastic polyurethane with the 1,2-cyclohexane dicarboxylic acid ester at a temperature of from 80 to 150° C.

13. The process according to claim 12, wherein the polyether-based thermoplastic polyurethane is obtained by reacting the organic diisocyanate with the polyol and a chain extender, optionally in presence of a catalyst, an auxiliary, an additive, or any combination thereof.

14. The process according to claim 11, wherein said reacting is carried out by a reactive extrusion process, a belt line process or a handcast process.

15. The process according to claim 13, wherein the reacting is at a temperature of from 70° C. to 280° C.

16. The process according to claim 13, wherein the reacting is carried out by a reactive extrusion process, a belt line process, or a handcast process.

17. The thermoplastic polyurethane composition according to claim 1, wherein, the thermoplastic polyurethane composition is in the form of an injection molded article, and the injection molded article does not exhibit surface blooming after annealing at 100° C. for 20 hours.

18. The thermoplastic polyurethane composition according to claim 1, wherein, the thermoplastic polyurethane composition is in the form of an injection molded article, and the injection molded article exhibits, upon annealing at 100° C. for 20 hours, a demolding force of no more than 87% of a molding force of a non-annealed molded article.

19. A method of making an injection molded article, comprising forming an article of a thermoplastic polyurethane composition according to claim 1 by injection molding.

* * * * *